E. A. STIGGINS.
LASTING MACHINE.
APPLICATION FILED MAR. 15, 1901.

931,809.

Patented Aug. 24, 1909.
8 SHEETS—SHEET 1.

WITNESSES:
Charles H. Hoyt
Thomas H. Seely

INVENTOR:
Edward A. Stiggins

E. A. STIGGINS.
LASTING MACHINE.
APPLICATION FILED MAR. 15, 1901.

931,809.

Patented Aug. 24, 1909.
8 SHEETS—SHEET 8.

WITNESSES:
Charles H. Hoyt.
Thomas H. Seely

INVENTOR:
Edward A. Stiggins

UNITED STATES PATENT OFFICE.

EDWARD A. STIGGINS, OF BEVERLY, MASSACHUSETTS, ASSIGNOR TO UNITED SHOE MACHINERY COMPANY, OF PATERSON, NEW JERSEY, AND BOSTON, MASSACHUSETTS, A CORPORATION OF NEW JERSEY.

LASTING-MACHINE.

931,809.  Specification of Letters Patent.  Patented Aug. 24, 1909.

Application filed March 15, 1901. Serial No. 51,287.

*To all whom it may concern:*

Be it known that I, EDWARD A. STIGGINS, a citizen of the United States of America, and resident of Beverly, county of Essex, Commonwealth of Massachusetts, have invented certain Improvements in Lasting-Machines, of which the following, read in connection with the accompanying drawings, is a specification.

This invention relates to mechanism for use in the manufacture of boots and shoes and more particularly to means for forming slits in the upper material. The invention is herein shown as applied to a lasting machine comprising pincers arranged to grip different portions of the upper and work them over the last at different times. The slitting means comprises a cutting device and means to actuate it for forming slits in the edge portion of the upper which, in the lasting operation, is laid over upon the innersole. It is found in practice that the plaits of the upper material at the toe and other curved portions of the shoe can be made to lie smoother upon the innersole if the overlapped portions are slitted. This is particularly advantageous when the upper is of stiff or thick leather.

A very important feature of the invention consists in slitting means arranged to penetrate the stock at a point approximately at the inner end of the slit to be formed and to slit the stock toward the edge thereof. The upper of a shoe being lasted is held upon the last firmly so that it will not be displaced or caused to buckle by a cutter slitting it toward the edge but sometimes it does buckle and is imperfectly slitted if the cutter acts from the edge.

In the machine herein shown the slitting means is arranged to penetrate the stock by a movement in one direction and to form or complete the slit by a movement in a different direction. To this end the illustrated actuating mechanism is constructed to advance the cutter over the stock into position adjacent to the inner end of the slit to be formed, then to actuate the cutter toward the stock to penetrate it and thereafter to move the cutter in approximately the plane of the stock for forming the slit from the point of penetration to the edge of the stock. The penetration of the stock preferably, although not necessarily, takes place during the first part of the return movement of the cutter, and as shown the stock is penetrated and the slit formed by a drawing cut advancing in the direction of the pulling strain effected by the lasting pincers. Preferably also the slit is made by a skiving cut which leaves the edges of the slitted stock beveled so that they will lie smoothly when overlapped. Preferably also the stock is penetrated by an oblique movement of the cutter advancing in the direction in which the slit is to be formed, whereby the cut is longer on the outer face of the stock than on the inner face. This enables the edges of the slit to be overlapped with very slight distortion or wrinkling of the outer face of the stock at the inner end of the slit.

Another feature of the invention consists in novel mechanism for actuating the cutter. Said mechanism comprises means by which the cutter is advanced over the work and into proximity therewith at or near the inner end of the slit to be formed. Means is then rendered operative for changing the course of the cutter and the cutter is retracted, being made first to penetrate the stock and then to draw through the stock for slitting it to its edge with a drawing cut. The cutter is shown as mounted on a pivoted carrier or bar which in the last portion of its advance movement engages a device for swinging the cutter toward the stock. A cutter controller is then moved into position to be engaged by the carrier during its retraction and the controller further turns the carrier to cause the cutter to penetrate the stock and continues to hold the cutter in the stock during its backward stroke.

A further important feature of the invention consists in the combination with slitting means of pincers laterally movable relatively to the slitting means for plaiting the upper and means for automatically actuating the slitting means when the pincers are given said relative lateral movements. In the machine shown the slitting means comprises a cutter mounted in a stationary support at each side of the pincers. The pincers normally occupy a central position between the cutters and move from front to back for pulling the upper and overlaying it upon the innersole. At the toe and sometimes at other parts of the shoe it is desirable to plait the upper for disposing of the surplus material thereof and to this end the pincers are given additional movements laterally from their central position, and preferably are also rotated. In practice the pincers at such times are moved to one side of their central position to grip the upper and, after having been uplifted to pull the upper, are moved to the other side of their central position, and usually turned, for plaiting or overlaying the portion of upper held by them upon a previously lasted portion. Means is commonly employed under control of the operator for rendering operative the mechanism for imparting these lateral movements to the pincers. In the illustrated construction embodying the present invention, connections are provided between said means and the cutter actuating mechanism by which said mechanism is rendered operative automatically to actuate that cutter toward which the pincers are moved in overlaying the upper upon the innersole.

Other features of the invention, including certain details of construction and arrangements of parts will be hereinafter described and pointed out in the claims.

The lasting mechanism herein shown is the same as that shown in United States Letters Patent No. 584,744, of June 15, 1897, to which reference may be made for details of the construction of said mechanism.

In the accompanying drawings which illustrate a preferred construction embodying the invention and in which the same reference characters indicate the same parts wherever they occur, Fig. 8 is a view of the mechanism shown in Fig. 7, as seen from the lefthand side; Fig. 10 shows the position of a cutter-carrying bar at the beginning of its advance stroke; Fig. 11 shows the position of a cutter-carrying bar when it is near the end of its advance stroke and is being thrown outwardly by the roller 160, the cutter-controlling block being in its elevated position in both Figs. 10 and 11; Fig. 12 shows the position of a cutter carrying bar when it has reached the limit of its advance stroke and in doing so has moved from under the cutter - controlling block which has therefore been permitted to descend. Fig. 12ª is a perspective view of the cutter-controlling block; Fig. 18 is a sectional view through one of the cutter-carrying bars and through associated parts; Fig. 19 shows two views of a cutter; Fig. 20 is a plan view of a partially lasted shoe and illustrates the manner in which the slitted portions of the upper are plaited or overlaid in securing them to the innersole of the shoe; Fig. 21 is a view similar to Fig. 20 and shows the relative position of the pincers and a cutter in the operation of slitting the upper; Fig. 21ª is a perspective view on an enlarged scale of a portion of upper after the slit has been formed, said view also showing in dotted lines the approximate path of the cutter in forming a slit.

On the main shaft D, of the machine represented, is a cam-block with cam face 2, and, in a bracket 4 secured on the machine frame, is an endwise movable rod 6, in position for bearing one end on cam face 2, and normally held in bearing with said cam by a suitably arranged spring 8. This combination operates for reciprocating the rod 6 endwise in one direction by means of the cam face 2 and in the reverse direction by means of said spring 8.

Figures 13, 14:
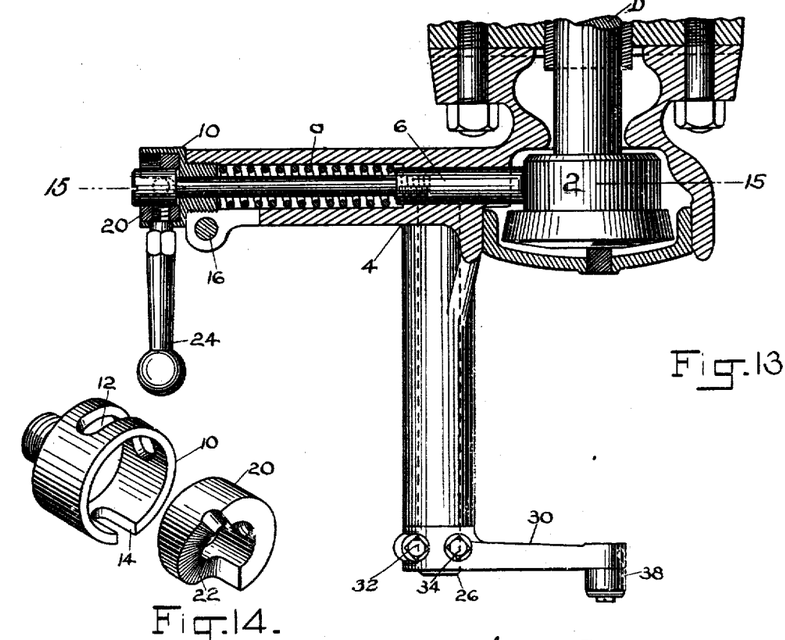
Fig. 13 is a view partly in section of a portion of the cutter-actuating mechanism.
Fig. 14 is a perspective view of detached parts which are shown in their assembled position in Fig. 13.

In the end of bracket 4 is a bushing 10, (see Fig. 14) which is provided with an oblong opening 12, and a recess 14, said bushing being securely clamped in place by screw 16 passing through lugs on the open split end of bracket 4. The rod 6 carries, in its outer end a laterally projecting pin 18, and within the bushing 10 is a ring 20, (see Fig. 14) provided with cam face 22, in bearing with said pin 18. The handle 24, connected to said ring and projecting outwardly through opening 12 in the bushing 10, forms a means by which the ring 20 can be turned so that the cam face 22 will actuate the pin 18, and, consequently move the rod 6 outwardly against tension of spring 8, to a distance that will allow the cam 2 to make a complete revolution without affecting endwise movement of rod 6. All this is to the end that the rod 6, and consequently, the cutter mechanism actuated therefrom as described hereinafter, may be thrown out of operation during intervals of continued operations of the machine, where cutting of the upper material is not desired.

Figure 15:
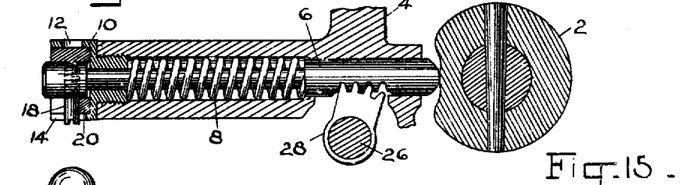
Figs. 15 and 16 are sectional views on line 15—15 of Fig. 13 showing respectively an operative and an inoperative position of a portion of the cutter-actuating mechanism.
Figure 16:
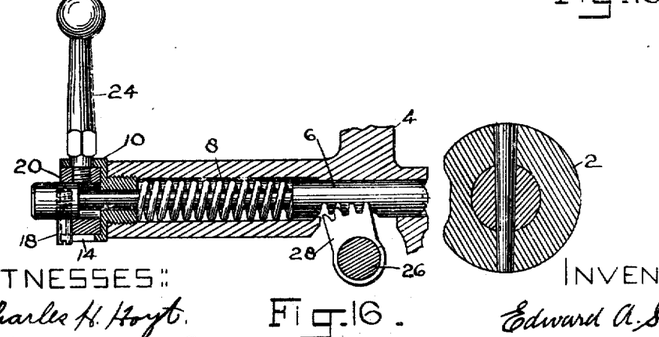

In a forwardly projecting arm of the bracket 4, is a shaft 26, having the part 28, securely fixed thereto said part being in toothed engagement with rod 6 (see Figs. 15 and 16). Shaft 26 carries the arm 30 which is adjustably secured thereto by means of screws 31, 32, 34. Depending from the arm 30 is a bar 38 having pivotal connection with said arm 30 by means of a pin 36, whereby to permit swinging movement laterally. Said bar 38 has a notch 40, to receive the projection 42, on rack-bar 44, and also a notch 46, to receive the projection 48 on rack bar 50. Intermediate the bars 44, 50, is room for the bar 38 to play up and down between the projections 42, 48 in a vertical line, and such, it may be remarked, is the normal or usual status of the bar 38.

Figure 1:
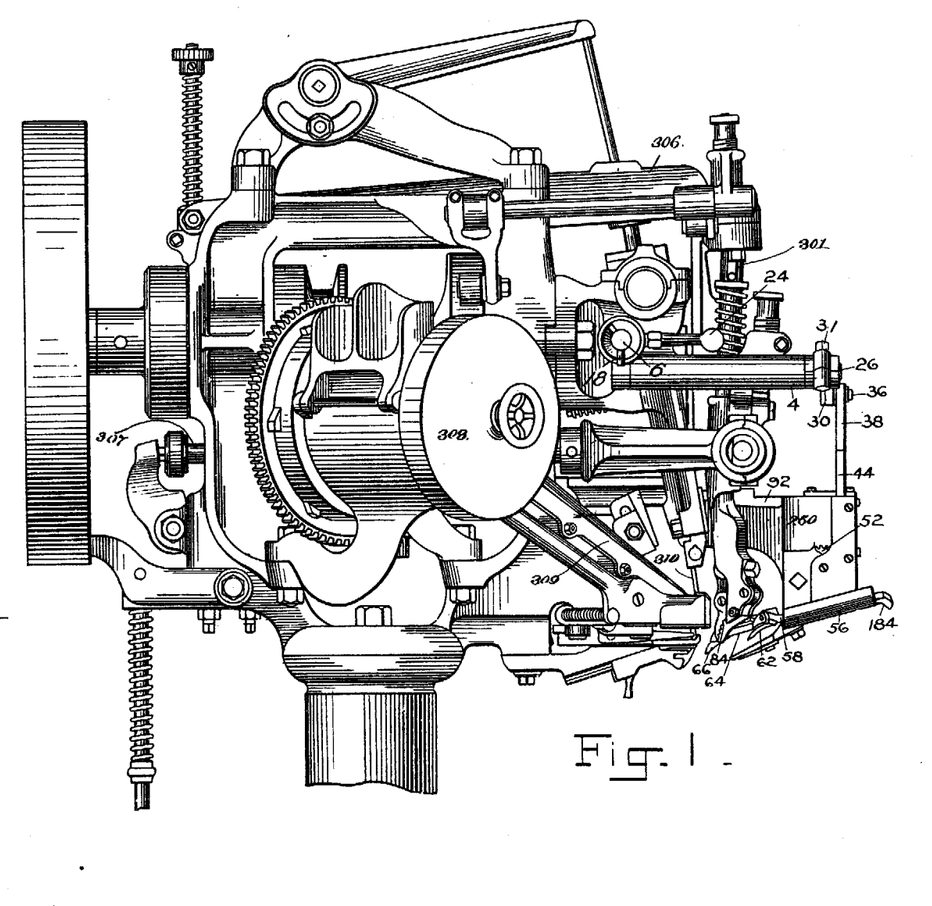
Figure 1 is a side elevation of the machine.
Figure 2:
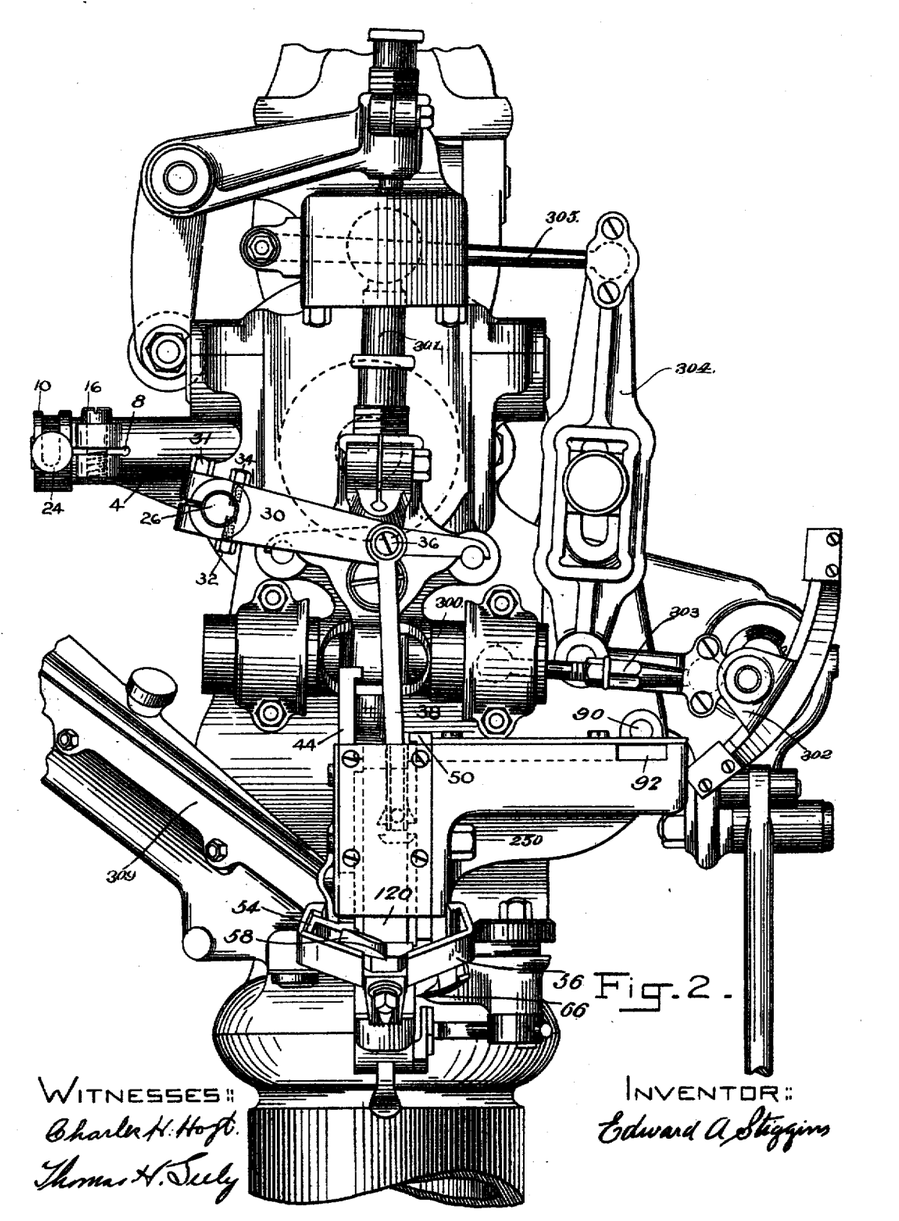
Fig. 2 is a front elevation.
Figures 9, 10, 11, 12:
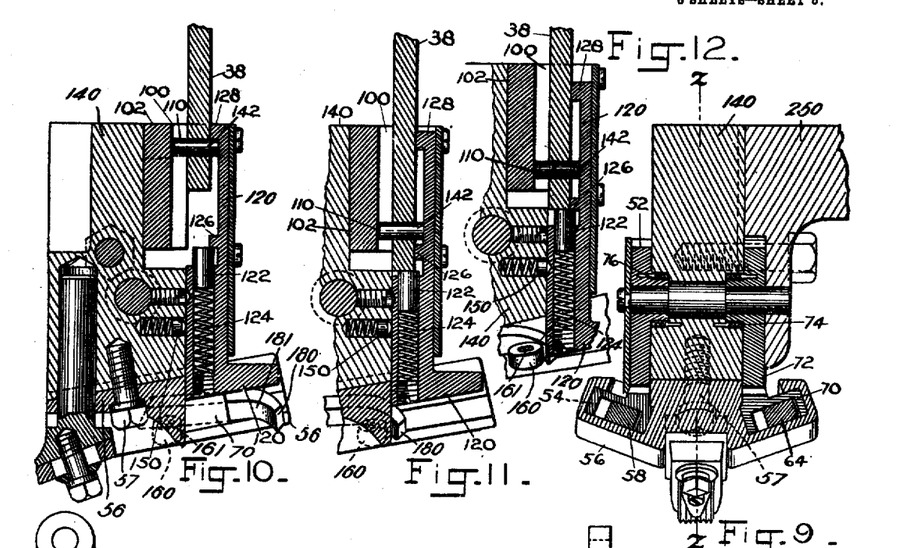
Fig. 9 is a vertical section on the line 9—9 of Fig. 8.
Figs. 10, 11, and 12 are vertical sections on substantially the line z—z of Figs. 6, 7, and 9.

There is fixed to the machine frame a bracket 250, see Fig. 2, having a face-plate 140 to the lower side of which is secured a frame 56 by means of a bolt 57, see Figs. 9 and 10. The frame 56 and its sustaining members form a stationary support for the rack-bars 44 and 50, the cutter-carrying bars 58 and 64, and the connections between the cutter-carrying bars and the rack-bars.

Figures 3, 4:
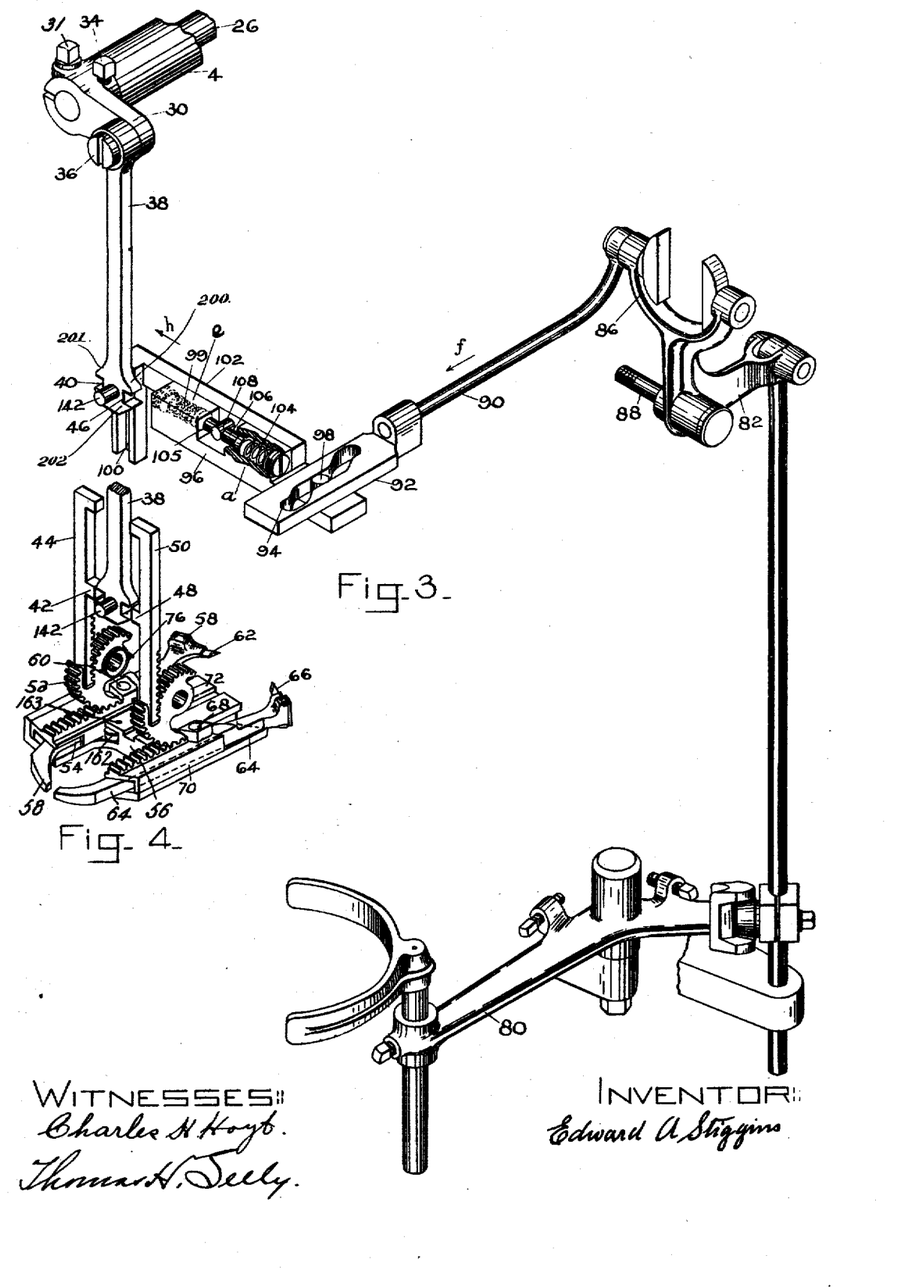
Figs. 3 and 4 are detail views of portions of the mechanism embodying the present invention, certain parts being broken away in these figures for the purpose of better illustrating the construction.
Figures 8, 12A:
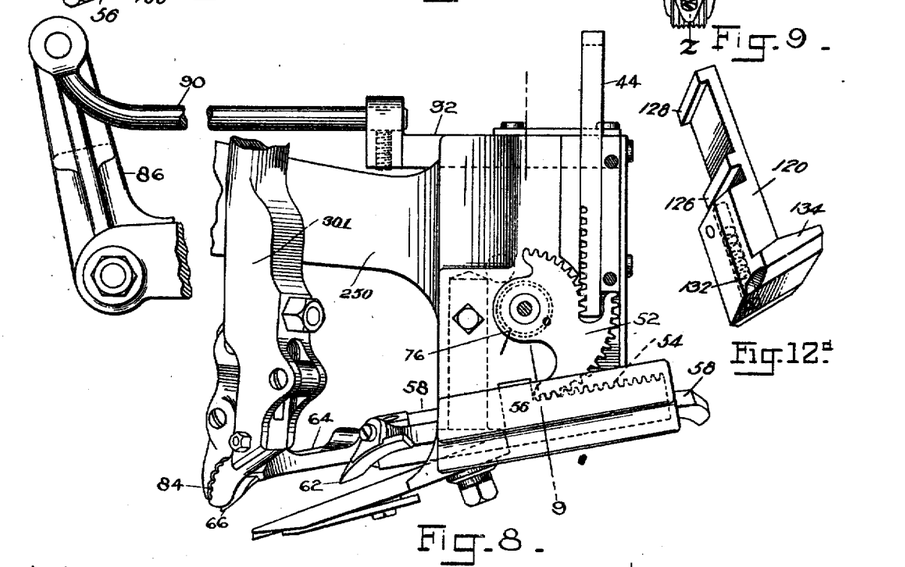

The rack-bar 44 is in mesh with a rack-pinion 52, see Figs. 4 and 8 which, in turn, inter-meshes with the rack-slide 54 adapted for endwise movement in frame 56. The cutter carrying bar 58, has connection with slide 54 to be moved endwise therewith, but said connection is effected pivotally by a stud 60, on which the bar 58 turns for carrying the cutter 62, laterally. For similar reason, the bar 64, carrying the cutter 66, is pivoted for turning on a stud 68, in the slide 70, which slide 70, being arranged for endwise movement in the frame 56, has toothed engagement with the rack-pinion 72, that, in turn, intermeshes with the bar 50. It will now be understood that lowering of the bar 50 operates to advance the cutter 66, while the uplifting of bar 50 operates to retract the cutter 66; and like movements of the bar 44 operate to advance and retract the cutter 62. Springs 74, 76, see Fig. 9, operate normally for holding the pinions 52, 72, in position with the slides 54, 70, and, consequently, the cutters 62, 66, retracted, the bars 44, 50, being then uplifted. The bar 38 is actuated, through the connection above described, upwardly by cam 2 and downwardly by spring 8, being moved once in each direction during every complete operation of the machine. To effect the required up and down movements of the bars 44, 50, as required for advancing and retracting the cutters 62, 66, it is only necessary to interlock the bar 38 with the bar 44, or 50, according to the one of said cutters which it may be desirable to put into action, and such interlocking is to be effected by swinging the bar 38 laterally, thereby causing it to receive the projections 42, or 48, as the case may require.

Referring now to Fig. 3, there will be observed a lever 80, with connections therefrom to the bell-crank lever 82. Said levers 80, 82, and connections are common to the machine set forth in the Letters Patent referred to above, and in said machine they have connection with other mechanism where through a movement of the lever 80 off the normal or center-line position thereof, to one side, will put into operation the mechanism for causing the pincers 84 to move laterally and turn for crimping or plaiting the upper materials in one direction, while movement of the lever 80 off the normal or center-line position to the other side, will put into operation the mechanism for causing the pincers to move laterally for crimping or plaiting the upper materials in the other direction. Said mechanism comprises the carrier 300 supporting the bar 301 to which the pincers are attached, the driver 302 and rod 303 for moving the carrier, and the lever 304 and rod 305 for turning the pincers. This mechanism for moving the pincers to crimp or plait the upper is inoperative while the lever 80 remains on said normal or center-line position, and during such time the machine operates for causing the pincers to move for gripping, pulling and overlaying the gripped upper without crimping or plaiting it, such movements being effected by means of the lever 306 and endwise-moving shaft 307. The machine is also provided with the hopper 308, raceway 309, and tack-driver 310, for securing the upper to the inner sole. For a more complete description of the mechanism referred to, reference may be had to the patent referred to above. It is to be observed here that the forked arm 86, of the lever 82, is in a vertical position, approximately, when the lever 80 stands in the said normal or center-line position and is carried from said vertical position by swinging it on the fulcrum pin 88, and this swinging takes place whenever lever 80 is moved, the arm 86 being carried from its vertical position in one direction to the other according to the direction in which lever 80 is moved off its said normal or center-line position.

Figure 5:
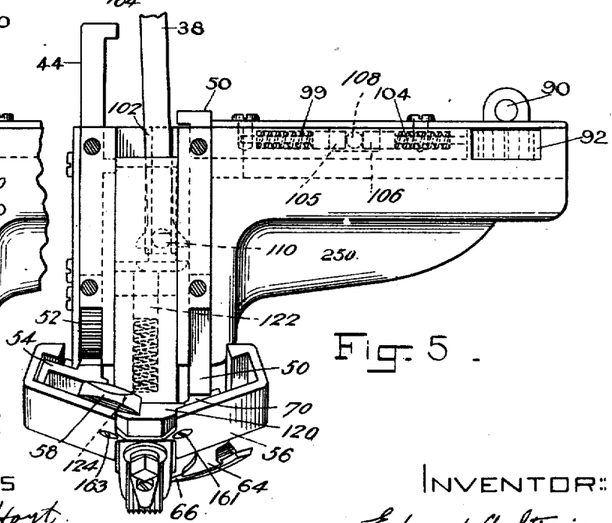
Fig. 5 is a front elevation of a portion of the mechanism for slitting the work and shows the relative positions of the parts when the righthand cutter is being actuated.
Figure 6:
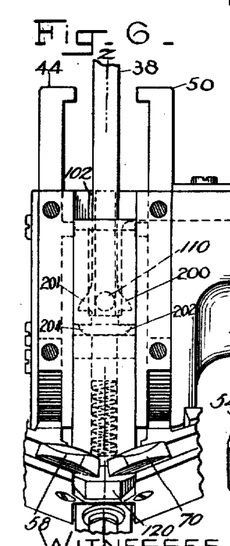
Fig. 6 is a similar view showing the relative position of the parts when neither cutter is being actuated.
Figure 7:
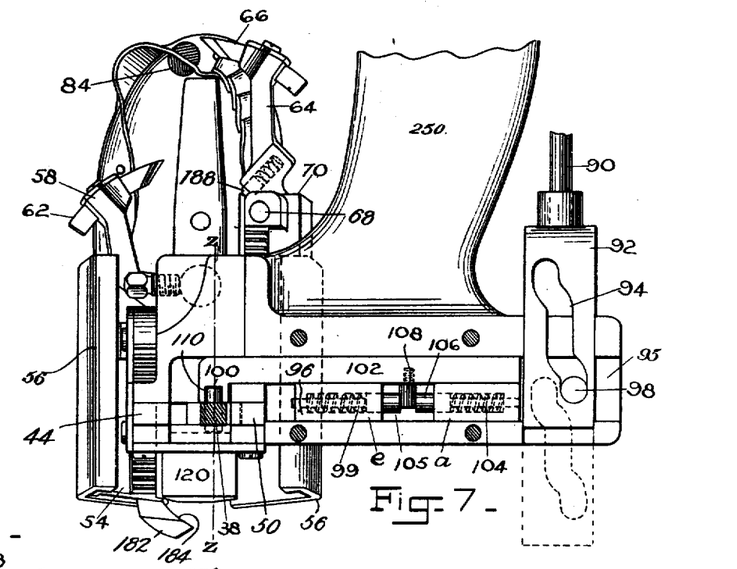
Fig. 7 is a plan view of mechanism shown in Fig. 5 and illustrates also the positions of the several parts of the mechanism with relation to a shoe being operated upon.

The rod 90 has one end pivotally connected with the arm 86, and carries the plate 92, provided with the cam-slot 94. In the block 96, mounted in the guideway 95 in the bracket 250 (see Fig. 7) is a pin 98, which extends into slot 94, so as to be actuated for endwise moving the block 96. In the bar 38 is a pin 110, which extends therefrom into a groove 100 in the plate 102 said plate being also mounted in the guideway 95. In the part *a* of block 96 is a spring 104, in bearing with one end of a plunger 106, and in part *e*, of said block 96 is a similar spring 99, in bearing with the end of a plunger 105. The plungers 106, 105, play loosely in the parts *e*, *a*, and bear on the stud 108, projecting from the side of plate 102. It may now be observed that, with the arm 86 in vertical position, the pin 98 stands centerwise of the slot 94. The plate 102 is then positioned to hold the pin 110 which reciprocates in the groove 100 in a central position intermediate the rack-bars 44 and 50, as shown in Fig. 6, during the up and down movements of bar 38 in a vertical line. A movement of the lever 80 to the right of its center-line position will swing arm 86, and, consequently, move the rod 90 in the direction indicated by arrow *f*, in Fig. 3. Such movement of rod 90 and the consequent movement of plate 92 will actuate the pin 98, and, consequently, move the block 96 and the plate 102 endwise in the direction indicated by arrow *h*, Fig. 3, whereby the bar 38 is swung over to engage the projection 42, on rack-bar 44. A reverse movement of the lever 80 to the opposite side of the center-line position will reversely move the plate 102 and block 96 for swinging the bar 38 over for engagement with projection 48 on rack-bar 50 see Fig. 5. It is to be noted that movement is transmitted from block 96 to plate 102 yieldingly, in one direction, through spring 104, and, in the other direction, through spring 99; also that the bar 38 is provided with cam faces 200, 201, 202, 204. All this is provided to the end that if the lever 80, and, consequently, the plate 102 be shifted while bar 38 is out of position for engaging the intended projections 42, or 48, it will be guided, (against the yielding tension of the acting spring 99 or 104), by the appropriate one of said cam faces riding on the intended projection, until the proper altitude of bar 38 is reached for the engagement with said projection to take place.

It will now be understood that a movement of the lever 80 to the right or left side of its center-line position, for causing the pincers to begin operations for crimping or plaiting the upper to the right or to the left, will simultaneously cause the right or the left cutter member to begin operations for slitting the upper. If it is desirable to use the pincers for plaiting the upper without slitting it, a suitable movement of the handle 24 will station the rod 6 out of engagement with cam 2 as hereinbefore described, and then the bar 38 will not be reciprocated and the cutters will remain at rest while the lever 80 and its connections may be moved as desired for causing the plaiting operation to be begun or suspended.

There is arranged for vertical sliding movement in the front face of the part 140 of the bracket 250 a block 120. The block has an enlarged and forwardly extended base or foot, as shown in Figs. 10 and 12ª, and an upwardly extended stem which is guided in the part 140. The base or foot of the block 12 is arranged in a vertical plane between the cutter-carrying bars 58 and 64, see Fig. 17, to occupy a position above said bars, as shown in Figs. 10, 11, 27 and 28, during the forward strokes of the latter and then to be depressed into the paths of the rear ends of the bars, as shown in Figs. 12, 29, 30 and 31, for controlling the courses followed by the cutters during their backward or cutting strokes. To this end the stem of the block has on its rear face a lug 128 which stands in the path of a stud 142, shown herein as the rear end of the pin 110, carried by the bar 38. The block has also a spring 124 which yieldingly upholds a plunger 122 located in the path of the lower end of the bar 38, a stop 126 being provided to prevent the plunger being forced entirely out of its socket by the spring. The arrangement is such that the block 120 is yieldingly depressed into the path of the rear ends of the cutter-bars by the engagement of the bar 38 with the plunger 122 during the last part of the downward stroke of the bar, which it will be understood is the stroke which forces the cutter-bars forwardly toward position to engage and penetrate the upper. In the last part of the upward stroke of the bar 38 the block is raised from the plane of the cutter-bars by the engagement of the stud 142 with the lug 128 on the stem of the block.

Figures 18, 19, 20, 21, 21A:
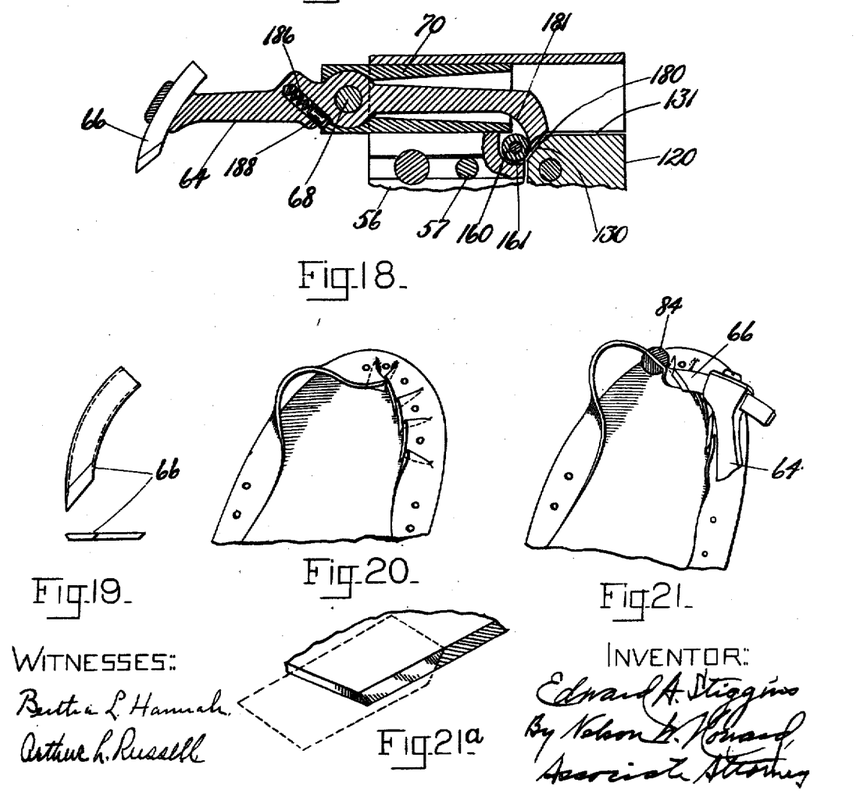
Figure 22:
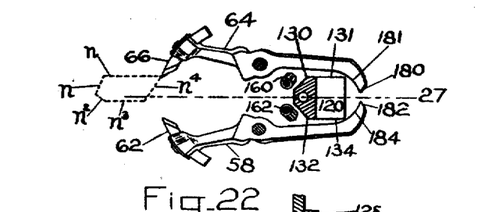
Fig. 22 is a plan view showing the cutters and their carrying bars, the rolls for swinging the cutters during the last portion of their forward stroke, and the cutter controlling block which determines the course followed by the cutter in its backward or cutting stroke. This figure shows the relative positions of the several parts when both cutters are in their retracted position and also indicates in dotted lines the path followed by one of the cutters when it is actuated.
Figure 23:
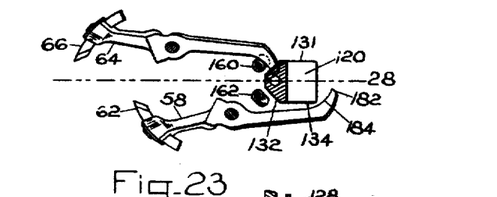
Fig. 23 is a view similar to Fig. 22 and shows the position of one of the cutter-bars when it has been advanced until the cutter-bar has met the roll for swinging the cutter inwardly toward the stock, the rear end of the cutter-bar being yet beneath the cutter-controlling block, this being the movement indicated by the dotted line n in Fig. 22.

For properly controlling the path of the cutters during their backward or cutting strokes the base or foot of the block 120 has its side faces shaped as shown in the plan views thereof found in Figs. 18 and 22, said side faces including inclined or cam faces 130 and 132 and straight faces 131 and 134. The cutter-carrying bars are acted upon by plungers 188, backed up by springs 186, as shown best in Fig. 18, which normally hold the cutter-carrying ends of the bars laterally away from the pincers and therefore out of position to engage the upper when it is held by the pincers. The forward stroke of a cutter, effected as has been described by the downward stroke of the bar 38, takes place when the cutter is held laterally away from the pincers by the plunger 188 and while the block 120 is in its elevated position so that the rear end of the cutter-bar moves under the block 120 as indicated by its position in Fig. 23.

Figure 17:
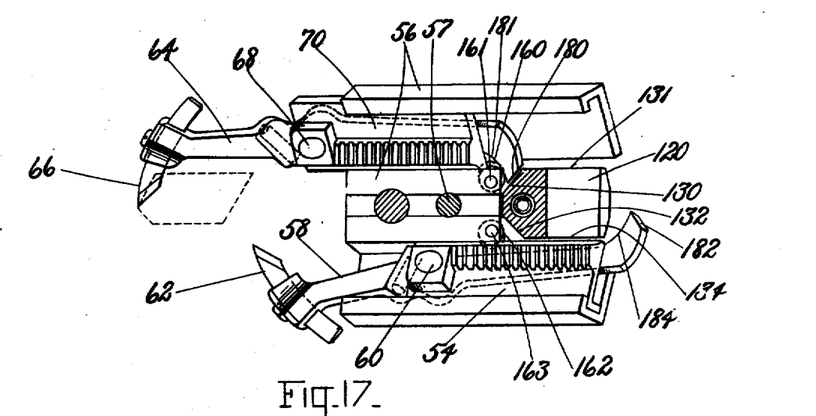
Fig. 17 is a plan view of the cutters and certain parts of the cutter-supporting means and cutter-actuating mechanism, the approximate path of one of the cutters being indicated in dotted lines.

For the purpose of swinging the cutter 66 inwardly toward the upper in the last part of its forward stroke a stud 161 is conveniently supported in the plate 56, as shown in Figs. 17 and 18, and carries a roll 160 in position to be engaged by a cam. face 181 on the rear portion of the cutter-bar 64. This engagement occurs at approximately the end of the forward stroke of the cutter and swings the bar to position the cutter in engagement with or approximately in engagement with the upper near the point where the inner end of the slit is to be made, and to position the rear end of the cutter-bar in front of the inclined face 130 of the block 120 which is depressed at this time. The plate 56 also supports a stud 163 carrying a roll 162 in position to coöperate similarly with a cam face 184 on the rear end of the cutter-bar 58 when that bar is being actuated.

It will be noted that the illustrated construction enables the spring 124 to be put under compression during the last part of the descent of the bar 38 and while the end of the cutter-bar being advanced is yet under the block 120. This causes the block to be quickly depressed behind the cutter-bar as soon as the end of the bar is advanced and swung outwardly by the roll 160 far enough to permit the block to descend.

Figure 26:
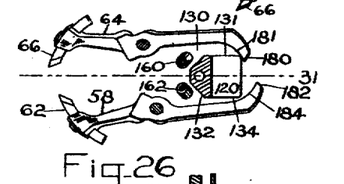
Fig. 26 is a view similar to Fig. 22 and shows the relative positions of the parts when the moving cutter-bar has been retracted in engagement with a side face of the cutter-controlling block to form the slit in the upper, this being the portion of the path of the cutter indicated by the dotted line $n^3$ in Fig. 22. This figure shows an incurved face of the cutter-bar as contacting with the cutter-controlling block and from this arrangement it is clear that continued rearward movement of the cutter-bar will permit the cutter to swing outwardly from the stock in that portion of its path indicated by the dotted line $n^4$ in Fig. 22.
Figure 27:
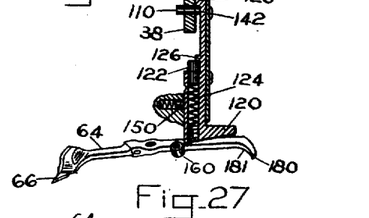
Fig. 27 is a vertical section on the line 27 in Fig. 22 and shows the vertical relation of the cutter-controlling block to the cutter-carrying bar.
Figure 28:
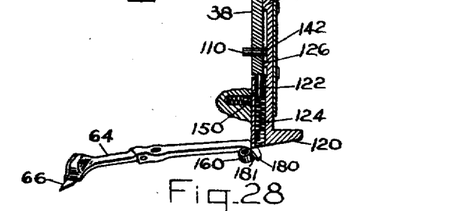
Figs. 28, 29, 30 and 31 are respectively vertical sections similar to Fig. 27 and taken on the lines 28, 29, 30 and 31 of Figs. 23, 24, 25 and 26. These views illustrate the vertical relation of the several parts at the periods in their movement shown in the corresponding plan views.
Figure 29:
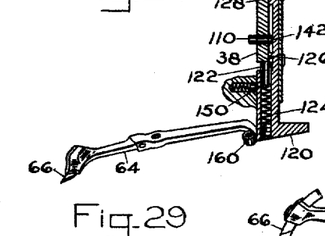
Figure 30:
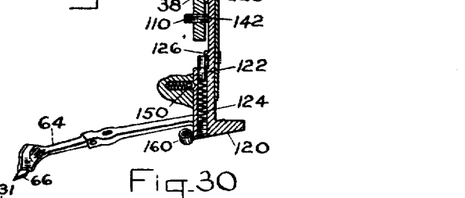
Figure 31:
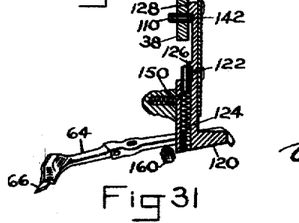

It is important that the block 120 remain in its depressed position during substantially the entire backward stroke of the cutter. To insure this, the rear face of the block is provided with a depression to be engaged by a spring-pressed plunger 150 mounted in the part 140 of the bracket as shown in Figs. 10, 11 and 12. In the rearward or slitting stroke of the cutter 66 the rear end face 180 of the bar 64 first engages the inclined face 130 of the block 120 which wedges the rear end of the bar outwardly and throws the cutter inwardly toward the pincers, causing it to penetrate the upper. The end face 180 of the bar rides off from the inclined face 130 and over the straight face 131 of the block 120 which holds the cutter in the upper and causes it to slit the upper to its edge. When the rear end of the block 120 is reached the inclination of the face 181 of the cutter-bar permits the bar to swing toward the starting position as shown in Fig. 26 and at this time the stud 142 on the bar 38 engages the lug 128 on the stem of block 120 and raises the block above the plane of the cutter-bars. The plunger 150 is forced out of the depression in the block as the block is raised.

The forward and backward stroke of the cutter is preferably longer than is required for the slit in order that the cutter may be retracted to a position out of the path followed by the pincers in overdrawing and plaiting the upper. By reference to Fig. 21, it will be seen that the cutter penetrates and slits a portion of upper extending obliquely from the previously lasted portion upwardly and laterally to the pincers. This position of the upper with relation to the cutter causes the cutter to form a skiving slit or a slit having beveled side faces, as shown in Figs. 20 and 21. It is also to be noted that the cutter preferably penetrates the upper by an oblique movement advancing in the direction in which the slit is made as will be understood by reference to Figs. 17, 21 and 21ª. This forms a slit the inner end of which is not perpendicular to the face of the upper but is oblique thereto so that the slit is longer on the outer side of the upper than it is on the under side, as shown in Fig. 21ª. This formation of the inner end of the slit enables the fold or plait to be made in the upper with very little wrinkling or puckering of the inner end of the slit when the upper is laid down on the innersole, as shown in Fig. 20, and this result is also helped by the fact that the side faces of the slit are beveled or skived as described. It will further be observed that the slit is begun at the inner end thereof so that it is certain to extend inwardly the desired distance, and that the cutter is moved outwardly from the point of penetration and slits the upper with a drawing cut to its edge. This slitting movement takes place in the direction in which the upper is being strained by the pincers so that there is no opportunity for the upper, even if it is soft and flexible, to buckle and cause an imperfect slit to be formed.

Figure 24:
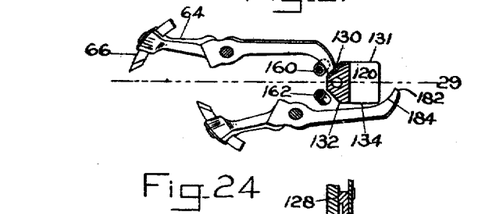
Fig. 24 is also a view similar to Fig. 22 and shows the position of the moving cutter-bar when it has been advanced in contact with its roll and the rear end of the bar has thereby been swung outwardly to permit the cutter-controlling block to descend, this being the movement indicated by the dotted line n' in Fig. 22.
Figure 25:
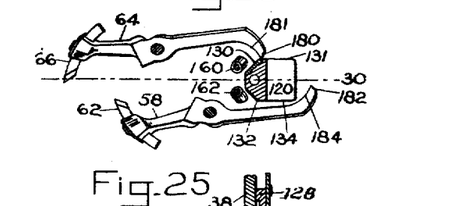
Fig. 25 is a view similar to Fig. 22 and shows the relative positions of the part when the moving cutter-bar has been retracted in engagement with an inclined face of the cutter-controlling block, whereby the cutter has been moved still farther toward and through the work to penetrate it, this being the portion of the path of the cutter indicated by the dotted line $n^2$ in Fig. 22.

In proceeding to describe the operation of the portion of the machine with which this invention is concerned the pincers will be supposed to have gripped and tightly pulled the upper, and to be about to move laterally and turn for crimping or plaiting the upper. At this juncture the rack-slide, on that side of the pincers toward which the plaiting movements are to take place, (for example, the rack-slide 70) is advanced. The dotted line $n$, (see Fig. 22) indicates the path of cutter 66 during that portion of such advance movement which takes place before the cam face 181 engages roll 160, and, during which, the cutter is away from the pincers sufficiently far to avoid interference with the material gripped thereby. But, after the cam face 181 engages roll 160 (see Fig. 23) the cutter 66 is moved sharply toward the pincers (see Fig. 24) on the line indicated by dotted line $n'$. This movement brings the cutter into bearing with the material or approximately into bearing therewith at the side of the pincers toward which the pincers move for forming the plait. By this time the block 120 will have been moved downwardly to the position for opposing cam face 130 to the cam face 180 on cutter bar 64 (see Fig. 24), whereupon the rack-slide 70 is retracted. During that portion of such retractive movement which takes place while the cam faces 130 and 180 are engaged, the cutter 66 will be carried inwardly and backwardly on a line $n^2$, and will have cut its way through the upper material with a drawing cut, whereupon the straight face 131, on block 120, will be opposed to cam face 180 on the cutter-bar 64 (see Fig. 25) after which the cutter is moved backwardly in a straight line $n^3$, until the slitting of the upper is completed, and thereafter the end of cutter-bar 64 passes in behind the block 120 (see Fig. 26), whereby the cutter 66 is moved on a line $n^4$ backwardly and outwardly to the starting position. The cutter is given the movement indicated by the line $n^4$ (Fig. 22) in order to enable it after it has slit the upper, to rise or pass over the edge thereof, so that at its next operation it may advance along the line $n$ (Fig. 22) without, as hereinbefore described, coming into contact with the gripped upper. The pincers are then moved laterally for superimposing the slitted portion of the upper material, whereupon the upper securing mechanism operates for securing it to the innersole. The block 120 is lifted in time for the cutting operations to be repeated in connection with the next operation of the pincers.

The operations above described as pertaining to the cutter 66 and its actuating connections are believed to sufficiently explain the like operations of cutter 62 and its actuating connections. Separate description thereof is therefore omitted.

Having described my invention, what I claim as new and desire to secure by Letters Patent is:—

1. In a machine for working an upper over a last, means for gripping the upper, means for plaiting or crimping the upper-slitting means, and means for actuating the slitting means in approximately the direction of the length of the cut to be formed for slitting the upper toward the marginal edge thereof.

2. In a lasting machine, mechanism for working an upper over a last, a cutting device, and means to actuate said device, whereby it is moved in one path preparatory for the cutting and in a different path for cutting the upper.

3. In a machine for working an upper over a last, a cutting device, and actuating mechanism to advance said device over the edge of the upper, then move said device in a line at an angle to its path in said advancing movement to penetrate the upper, and thereafter retract said device through the upper.

4. In a lasting machine, mechanism for working an upper over a last, a cutting device, means to actuate the device, independently of the overworking mechanism, over and simultaneously toward the upper, to cause said device to penetrate the upper with a drawing cut, and to move said device to slit the upper.

5. In a machine for working an upper over a last, adapted to work by repeated operations applied to different parts of the upper at different times, means, adapted for movement during some of the operations of the machine, to plait the upper, and cutting means movable through the stock lengthwise of the cut to be formed for slitting the upper toward the marginal edge thereof.

6. In a machine for working an upper over a last by repeated operations upon different parts, means, adapted for movement during some of the operations of the machine, to plait the upper, and means for slitting the upper toward the marginal edge thereof, said slitting means being movable lengthwise of the slit to be formed and normally operative when the plaiting means is operative.

7. In a machine for working an upper over a last, in combination, means for crimping or plaiting the upper, and means for slitting the upper toward the marginal edge thereof, said slitting means being movable lengthwise of the slit to be formed and normally operative when the plaiting means is operative, and means for rendering the slitting means inoperative during repeated operations of the plaiting means.

8. In a machine for working an upper over a last the combination of means for plaiting the upper, separately operating means for slitting the upper toward the marginal edge thereof, said slitting means being movable lengthwise of the slit to be formed, and means to be operated by the workman for rendering the plaiting means and the slitting means simultaneously operative or inoperative.

9. A lasting machine comprising mechanism for working an upper over a last, a movable part, a cutter-carrying member supported movably on said part, means to advance and retract the part, and means for actuating the cutter-carrying member to carry the cutter out of the line of movement of said part.

10. In a machine for working an upper over a last, grippers, a cutting device, a bar for carrying said device, means to advance and retract the bar, and means independent of the grippers to actuate the bar for carrying the cutter laterally.

11. In a machine for working an upper over a last, means to grip the upper, a cutting device, a pivoted bar for carrying said device, mechanism for reciprocating said bar, comprising yielding means for moving the bar forwardly, and means to turn the bar on said pivot.

12. An upper slitting mechanism comprising a cutting device, actuating means to move said device for slitting the upper, a part to be moved by the workman, and intermediate yielding mechanism actuated by said part for causing the cutting operations to begin.

13. An upper slitting mechanism comprising a cutting device, means to actuate said device for cutting the upper, said means including a movable part or member, and a yielding mechanism through which said part is moved for starting or stopping the cutting operations.

14. An upper slitting mechanism comprising a cutting device, a cam, intermediate mechanism actuated by said cam for causing the cutter to slit the upper, said intermediate mechanism including the rod 6, a spring for holding said rod in engagement with said cam, and means for moving said rod against the tension of said spring, to withdraw it from control of the cam whereby operations of the cutter-actuating mechanism are discontinued.

15. In a machine for working an upper over a last, the combination with means for pulling an upper over a last, of means for imparting to the pulling means movements for crimping or plaiting the upper, a cutting device adapted for movement independently of said means, and means for actuating said device to slit the upper toward the marginal edge thereof.

16. In a machine for working an upper over a last, a cutting device, means for actuating said device, said actuating means having provision for causing the cutting device to move in a line at an angle to the plane of the upper to engage the upper and to move in a different direction to cut the upper.

17. In a machine for working an upper over a last, means for automatically working the upper over the last, means for automatically securing the upper in position, a slitting device and means for actuating said device to engage the upper at a point substantially coincident with the inner end of the slit to be formed and for actuating said device to cut the upper toward its edge.

18. A lasting machine adapted for working on the upper by repeated operations of the machine, comprising a device to cut the upper, and means for actuating said device yieldingly into engagement with the upper at a distance from the edge of the upper and for actuating said device to cut the upper toward its edge.

19. In a machine for working an upper over a last, the combination with pincers adapted for gripping the upper, of a cutting device, means to turn the pincers and means for actuating the cutting device to engage the upper at a distance from its edge and for actuating the cutting device to cut the upper toward its edge.

20. In a machine for working an upper over a last, the combination with pincers adapted for gripping the upper, of a cutting device, means to turn the pincers, and cutter actuating mechanism that is operative when the pincers are turned, said mechanism comprising means for actuating the cutting device to engage the upper at a distance from its edge and for actuating the cutting device to cut the upper toward its edge.

21. In a machine for working an upper over a last, the combination with the pincers adapted for gripping the upper, of a cutting device, means to move the pincers laterally, means to turn the pincers and mechanism for actuating the cutting device to engage the upper at a distance from its edge and thereafter cut the upper toward its edge.

22. In a machine for working an upper over a last, the combination with pincers adapted for gripping the upper, of a cutting device, means to turn the pincers, and cutter actuating mechanism that is operative when the pincers are turned and inoperative when the pincers are not turned, said mechanism comprising means for actuating the cutting device to engage the upper at a distance from its edge and for actuating the cutting device to cut the upper toward its edge.

23. In a machine for working an upper over a last, a cutting device, means for actuating said cutting device to engage the upper at a distance from the edge of the upper, mechanism for controlling the path of movement of said cutting device and means for rendering said controlling mechanism operative during a part of the movement of the cutting device and inoperative during another part of the movement of said cutting device.

24. In a machine for working an upper over a last, a cutting device, means to advance and retract said device, mechanism to control the path of movement of said device, and means for rendering said controlling mechanism operative during a part of the movement of the cutting device and inoperative during another part of the movement of said cutting device.

25. A lasting machine adapted for working on the upper by repeated operations of the machine, comprising a cutting device, means for actuating said device in a direction to engage the upper at a distance from its edge, and for actuating said device in a different direction to cut the upper toward its edge.

26. An attachment for a lasting machine to slit an upper while it is being worked over a last comprising a cutting device and means for causing said device to penetrate the upper at a distance from its edge and then by a movement in a direction at an angle to the penetrating movement to slit the upper toward its edge.

27. A machine to slit an upper while it is being worked over a last comprising a lasting device, means for actuating it, a cutting device, and means for actuating the cutting device in time relation with the lasting device to penetrate the upper at a distance from its edge and then to slit the upper to its edge by a movement in a direction at an angle to the direction of the penetrating movement.

28. In a machine for working an upper over a last, pincers, and means for relatively actuating the pincers and last to stretch the upper, a slitting device, and means to actuate said device to penetrate the upper at a point substantially coincident with the inner end of the slit to be formed, and to cut the upper with a drawing cut toward its edge.

29. In a machine of the class described, the combination with pincers for working successive portions of an upper over a last at different times, of a slitting device and means to actuate said device in a direction toward the edge of the upper to cut the upper from a point within the edge thereof toward the edge.

30. In a machine for working an upper over a last, the combination with a cutter, of pincers arranged for movement laterally with relation to the cutter for plaiting the upper, and means for automatically actuating the cutter when the pincers are so moved.

31. In a machine for working an upper over a last, the combination with a pair of cutters, of pincers arranged between the cutters and movable laterally toward either cutter into position for gripping the upper, and means for automatically actuating the cutter away from which the pincers are moved in approaching their gripping position.

32. In a machine of the class described, the combinations with pincers and means to actuate the pincers for laying an upper over a last, of a cutter-supporting means which is stationary with relation to the laterally movable pincers, a cutter carried thereby, and means to actuate the cutter for forming slits in the upper.

33. In a machine for working an upper over a last, the combination with laterally moving pincers and means to actuate the pincers for overworking the upper, of cutter-supporting means, which is stationary with relation to the laterally movable pincers, a cutter carried thereby, cutter-actuating means, and means arranged to render operative by a single actuation the mechanism for moving the pincers laterally and the cutter-actuating means.

34. In a machine for working an upper over a last, the combination with laterally movable pincers and mechanism for actuating them laterally in either direction, of cutter-supporting means, which is stationary with relation to the laterally movable pincers, a plurality of cutters mounted thereon, cutter-actuating means, and means for rendering the pincer-actuating mechanism operative for moving the pincers laterally in the desired direction and rendering the cutter-actuating mechanism operative to actuate the appropriate cutter.

35. In a machine of the class described, means for working an upper over a last by repeated operations applied to different parts of the upper at different times, and means for slitting the upper toward the marginal edge thereof, said means being movable lengthwise of the slit to be formed, of mechanism arranged to be rendered operative for actuating the slitting means during some of the overworking operations and inoperative during other overworking operations.

36. In a machine of the class described, the combination with means for working an upper over a last, of a cutting device, and means for actuating said device in one direction toward cutting position and then in a direction at an oblique angle to its first movement to slit the upper.

37. In a machine of the class described, the combination with means for working an upper over a last, of a cutting device, and means to actuate said device in one direction to penetrate the upper and in another direction to slit the upper with a drawing cut.

38. In a machine of the class described, the combination with means for working an upper over a last, of a slitting device, and actuating means therefor constructed and arranged to cause said device to penetrate the upper by a movement at an oblique angle to the face of the upper and to cut the upper to its edge by a movement in a direction substantially parallel with the face of the upper.

39. In a machine of the class described, the combination with means for working an upper over a last, of a slitting device, and actuating mechanism for causing the device to penetrate the stock and then to move in a different direction toward the edge of the stock for forming a slit therein.

40. In a machine of the class described, the combination with pincers for pulling an upper over a last, and a cutting device, of means for moving the cutting device in the direction of the pulling strain effected by the pincers to slit the upper.

41. In a machine for working an upper over a last, a cutting device, and actuating mechanism for advancing and retracting the cutting device, said actuating mechanism including devices adapted to become operative during said movements for causing the cutting device to penetrate and slit the upper.

42. In a machine for working an upper over a last, the combination with pincers, actuating mechanism for causing the pincers to grip, updraw and overdraw the upper, of a cutting device and means to actuate the cutting device to penetrate the upper at a distance from its edge during the updraw and to slit the upper to its edge.

43. In a machine of the class described, the combination with means for working an upper over a last, of a cutter, a carrier therefor, cutter-controlling means, and means for reciprocating the carrier and moving the controlling means into position to be engaged by the cutter-carrier during its stroke in one direction and for withdrawing the controlling means from the path followed by the cutter in its reverse stroke.

44. In a machine of the class described, the combination with means for working an upper over a last, of a cutter, a carrier therefor, cutter-controlling means, means for reciprocating the carrier and moving the controller out of position to be engaged by the cutter-carrier during its stroke in one direction and for moving the controller yieldingly toward position to be engaged by the carrier during its reverse stroke, and means for holding the controlling means in the path of the carrier during said reverse stroke.

45. In a machine of the class described, the combination with means for working an upper over a last, of means for penetrating the upper at a distance from its edge and forming a skiving cut extending to the edge of the upper, said cut being longer on the outer face of the upper than on the inner face.

46. An attachment for a lasting machine to slit an upper while it is being worked over a last comprising the pivoted and longitudinally movable blade holder 64, the blade carried by it, the means for reciprocating the blade holder lengthwise, and the cam block 120 for rocking the holder.

47. An attachment for a lasting machine to slit an upper while it is being worked over a last comprising the pivoted and longitudinally movable blade holder 64 having the oblique socket for the blade, the cam-shaped tail-piece 181, means for moving the holder lengthwise, and means coöperating with the tail-piece to turn the holder on its pivot.

48. An attachment for a lasting machine to slit an upper while it is being worked over a last comprising the pivoted and longitudinally movable blade holder 64, the blade carried thereby, means for reciprocating the holder lengthwise, and the cam 120 movable into and out of the path of the blade holder for effecting and controlling its pivotal movements.

49. An attachment for a lasting machine to slit an upper while it is being worked over a last comprising two slitting devices, the actuating means therefor, and their controlling means including the cam plate 92 having a neutral portion and the opposed cam portions 94 for determining which slitting device shall be operative.

50. A machine to slit an upper while it is being worked over a last comprising the lasting grippers, the knee lever, and connections therefrom to vary the operation of the grippers, the slitting device, and a connection from the knee lever to the slitting device to vary the operation of the slitting device.

51. A machine to slit an upper while it is being worked over a last comprising the lasting grippers, the knee lever, and connections therefrom to cause the grippers to form plaits toward the right or toward the left and to discontinue the formation of plaits, the slitting devices, and connections from the knee lever to said devices to vary the slitting operation with the plaiting operation.

52. An attachment for a lasting machine to slit an upper while it is being worked over a last comprising a cutting device and means for actuating it to engage the upper at some distance from its edge and then cut with substantially the same portion of its cutting edge from the point of engagement toward the edge of the upper.

Signed by me at Lynn, Mass., this 11th day of Mar., 1901.

EDWARD A. STIGGINS.

Witnesses:
 C. B. TUTTLE,
 A. M. TUTTLE.